United States Patent [19]
Kusase et al.

[11] Patent Number: 5,655,485
[45] Date of Patent: Aug. 12, 1997

[54] ROTARY ELECTRIC MACHINE HAVING ENGINE COOLING WATER PUMP

[75] Inventors: Shin Kusase, Obu; Atsushi Umeda, Anjo, both of Japan

[73] Assignee: Nippondenso Co., Ltd., Kariya, Japan

[21] Appl. No.: 651,485

[22] Filed: May 22, 1996

[30] Foreign Application Priority Data

Jul. 28, 1995 [JP] Japan ............................. 7-193869

[51] Int. Cl.$^6$ ............................................. F01P 1/06
[52] U.S. Cl. ................................. 123/41.31; 310/54
[58] Field of Search ..................... 123/41.31, 41.44; 310/54

[56] References Cited

U.S. PATENT DOCUMENTS

| | | | |
|---|---|---|---|
| 4,922,148 | 5/1990 | Kitamura | 123/41.31 |
| 4,980,588 | 12/1990 | Ogawa | 123/41.31 |

FOREIGN PATENT DOCUMENTS

| | | |
|---|---|---|
| 6-070507 | 3/1994 | Japan . |
| 6-296348 | 10/1994 | Japan . |

*Primary Examiner*—Noah P. Kamen
*Attorney, Agent, or Firm*—Cushman, Darby & Cushman IP Group of Pillsbury Madison & Sutro LLP

[57] ABSTRACT

A rotary electric machine such as an alternator or a motor has an engine-cooling water-pump in an integral unit. The rotary electric machine is composed of a frame secured to a front surface of an engine, an electric machine unit, a pump unit and a driving unit. The frame has a wall portion and a water passage formed on a rear surface of the wall portion and connected between the engine cooling system and the engine. The electric machine unit has a stator disposed in thermal contact with a front surface of the wall portion and a rotor fixed to a shaft of the driving unit. The pump unit is fixed to the frame and has a pump impeller disposed in the water passage to take cooling water from the cooling system to the engine through the cooling water passage. The driving member includes a pulley driven by an engine and a shaft supported by the wall portion through a bearing to drive the rotor and the impeller.

14 Claims, 6 Drawing Sheets

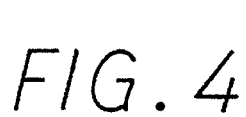
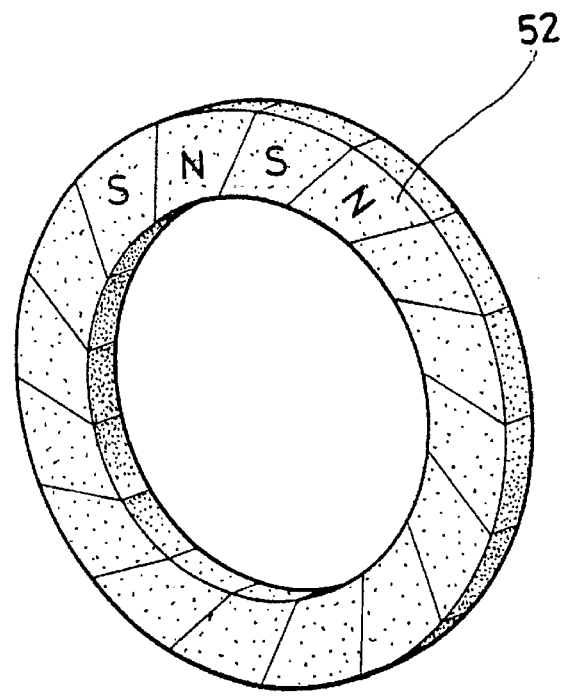
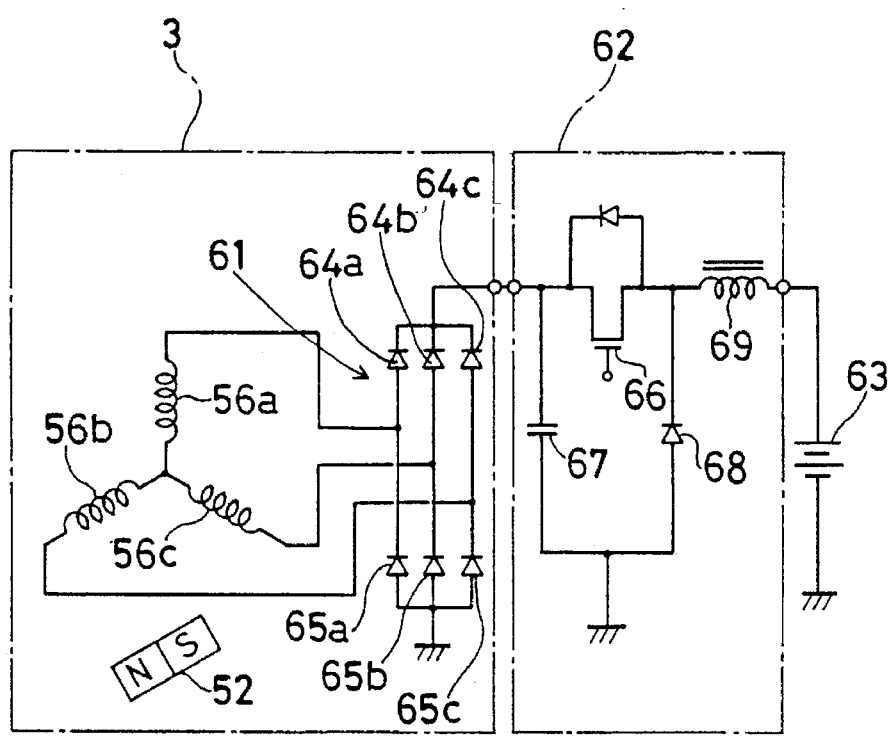

ROTARY ELECTRIC MACHINE HAVING ENGINE COOLING WATER PUMP

CROSS REFERENCE TO RELATED APPLICATION

The present application is based on and claims priority from Japanese Patent Applications No. Hei 7-193869, filed on Jul. 28, 1995, the contents of which are incorporated herein by reference.

BACKGROUND OF THE INVENTION

1. Field of the Invention

The present invention relates to a rotary electric machine having an engine cooling water pump and, more particularly, relates to an alternator for a vehicle which has a water pump integrally combined therewith.

2. Description of the Related Art

Recently, an increased number of electric devices and components have been installed in the vehicle and the alternator for the vehicle has been required to generate more electric power with a limited volume thereof. In addition, since the engine power has been increased, temperature in the engine compartment has become higher. As a result, it is difficult to cool the alternator by air in the engine compartment.

It has been proposed that outside air is taken from a portion under the engine to cool the alternator through a duct. In this case, however, installation of the air duct is troublesome and increases installation cost because the space of the engine compartment for the installation is very limited.

U.S. Pat. No. 4,980,588 (which corresponds to JA-A-62-189942) proposes that the engine cooling water is taken from the engine into the alternator through a water duct to cool the rectifier and the stator. In this case, the water duct becomes too heavy to the alternator having a regular size, or otherwise, the alternator size must be increased with the result of increase in weight and cost.

U.S. Pat. No. 4,922,148 (which corresponds to JA-A-1-274640) proposes that a specific cooling water passage is formed in a portion of the engine block, to which the alternator is directly fixed to introduce the cooling water into the inside of the alternator. In this case, the specific water passage in the engine block increases cost of the engine, and the water sealing in the alternator also increases the alternator cost.

SUMMARY OF THE INVENTION

The present invention has an object of providing an improved rotary electric machine having cooling water structure which requires no specific cooling water passage in the engine or in the inside of the rotary machine.

Another object of the present invention is to provide a new rotary electric machine having an engine-cooling-water pump integrally combined therewith.

Another object of the present invention is to provide an inexpensive water-cooled rotary electric machine having a reduced number of parts.

Another object of the present invention is to provide a rotary electric machine having an engine-cooling pump which prevents the pressure loss of the engine cooling water.

A further object of the present invention is to provide a rotary electric machine having an integrally combined engine-cooling water-pump of an engine cooling system which comprises a pump unit having a pump cover, a first water passage formed on an inner surface of the pump cover and connected to the engine cooling system, a second water passage connected to the engine and an impeller disposed between the first water passage and the second water passage; an electric machine unit having a stator disposed in thermal contact with the pump cover and a rotor for supplying the stator with magnetic flux; and a driving member including a shaft connected to the impeller and the rotor for transmitting driving force.

Preferably, the stator has a flat-disk-type core and an armature winding. A permanent magnet is also installed to the rotor.

In such a rotary electric machine, the pump cover may comprise an outer cylindrical member for covering the electric machine unit from foreign particles. In addition, the rotor may have an annular member for covering the electric machine unit from foreign particles.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 4 is a perspective view illustrating a permanent magnet of the alternator according to the first embodiment;

FIG. 6 is a circuit diagram of the alternator and a voltage regulating unit according to the first embodiment.

DETAILED DESCRIPTION OF THE PREFERRED EMBODIMENTS

First Embodiment

Figure 1:
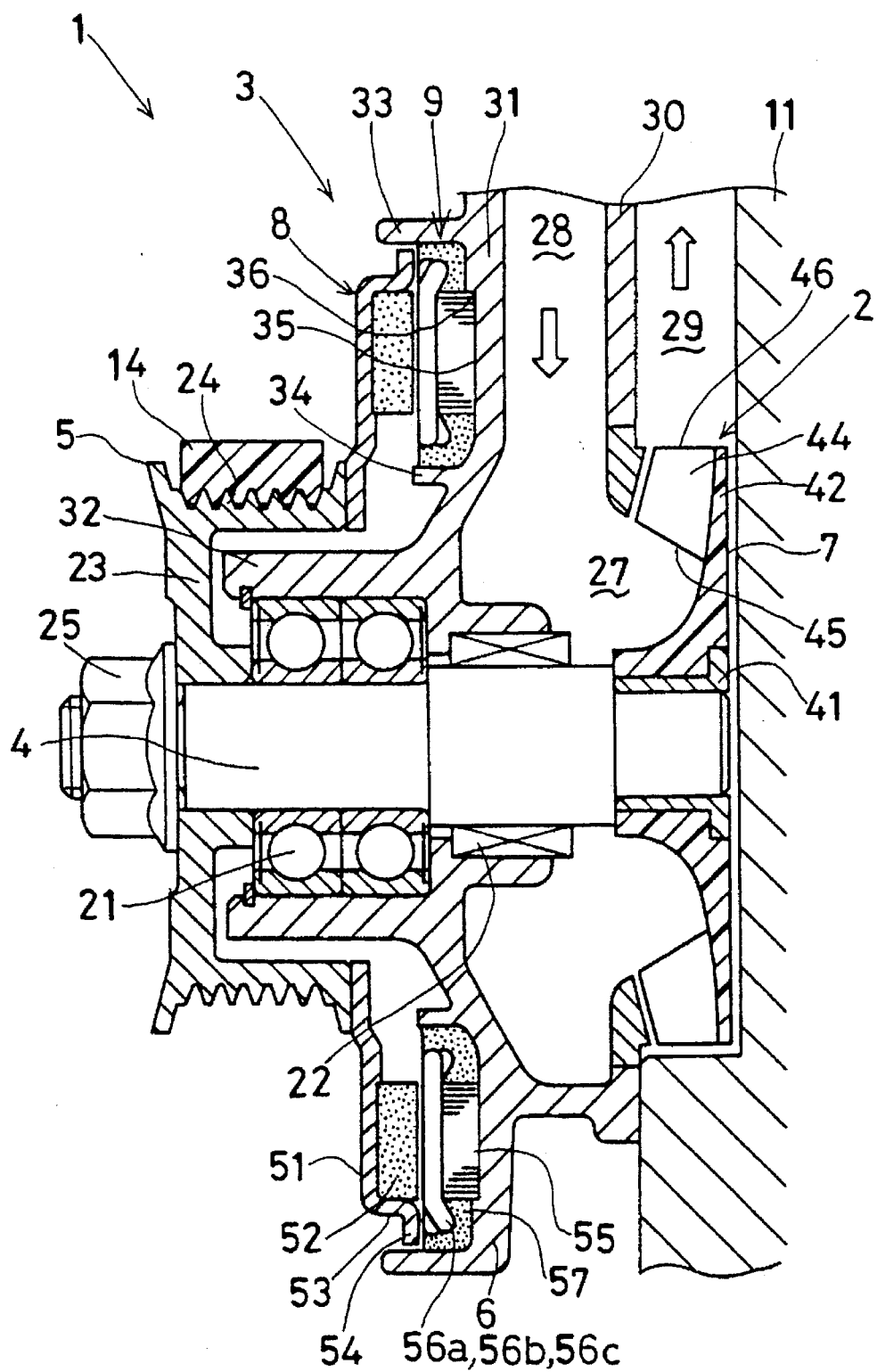
FIG. 1 is a cross-sectional side view illustrating a main portion of an alternator having an integrally combined water pump according to a first embodiment of the present invention.

A first embodiment is described with reference to FIG. 1–FIG. 6.

An alternator having an integrally combined water pump 1 (herein after referred to as the alternator) is composed of a water pump 2 which circulates cooling water in an engine E, an alternator unit 3 and a voltage regulating unit 62 as shown in FIG. 6.

The cooling water is driven by the water pump unit 2 to circulate through an engine cooling system which includes a cooling water duct (not shown), a radiator (not shown) and the water pump unit 2 and a water jacket of the engine E. The cooling water generally includes ethylene glycol as an antifreeze and some preservative.

Figure 2:
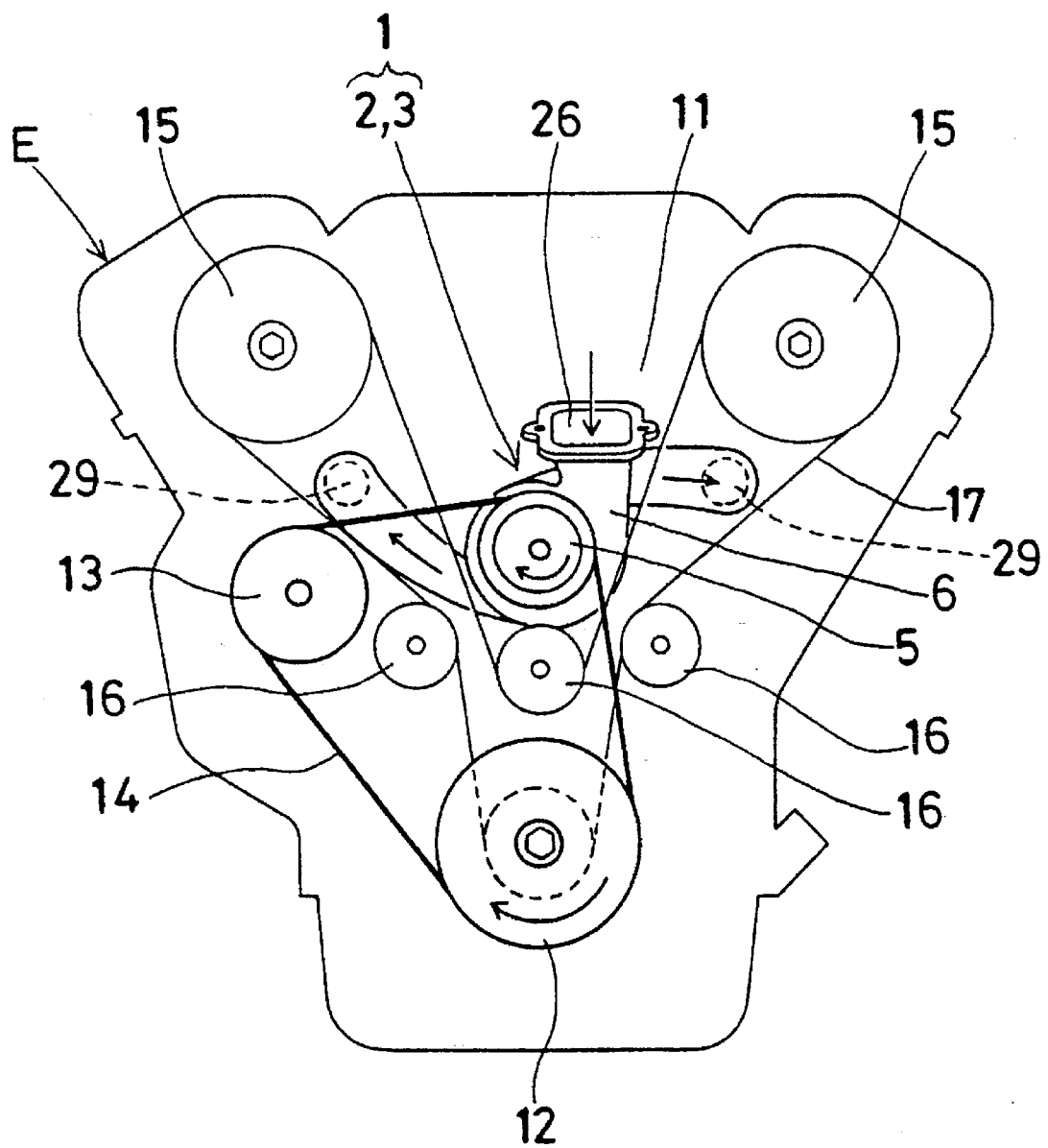
FIG. 2 is a schematic view illustrating a front portion of an engine equipped with the alternator according to the first embodiment.

As shown in FIG. 2, the alternator 1 is fixed to a front portion of an engine housing 11 to which a crank shaft pulley 12, a bowl-shaped poly-V-pulley 5 of the water pump unit 2 and another poly-V-pulley 13 are also fixed. A poly-V-belt 14 is stretched around the pulleys 5, 12 and 13.

Two cam shaft pulleys 15 and three idlers 16 are also fixed to the front portion of the engine housing 11 and a timing belt 17 is stretched around those pulleys 15 and 16 and the crank shaft pulley 12.

Figure 3:
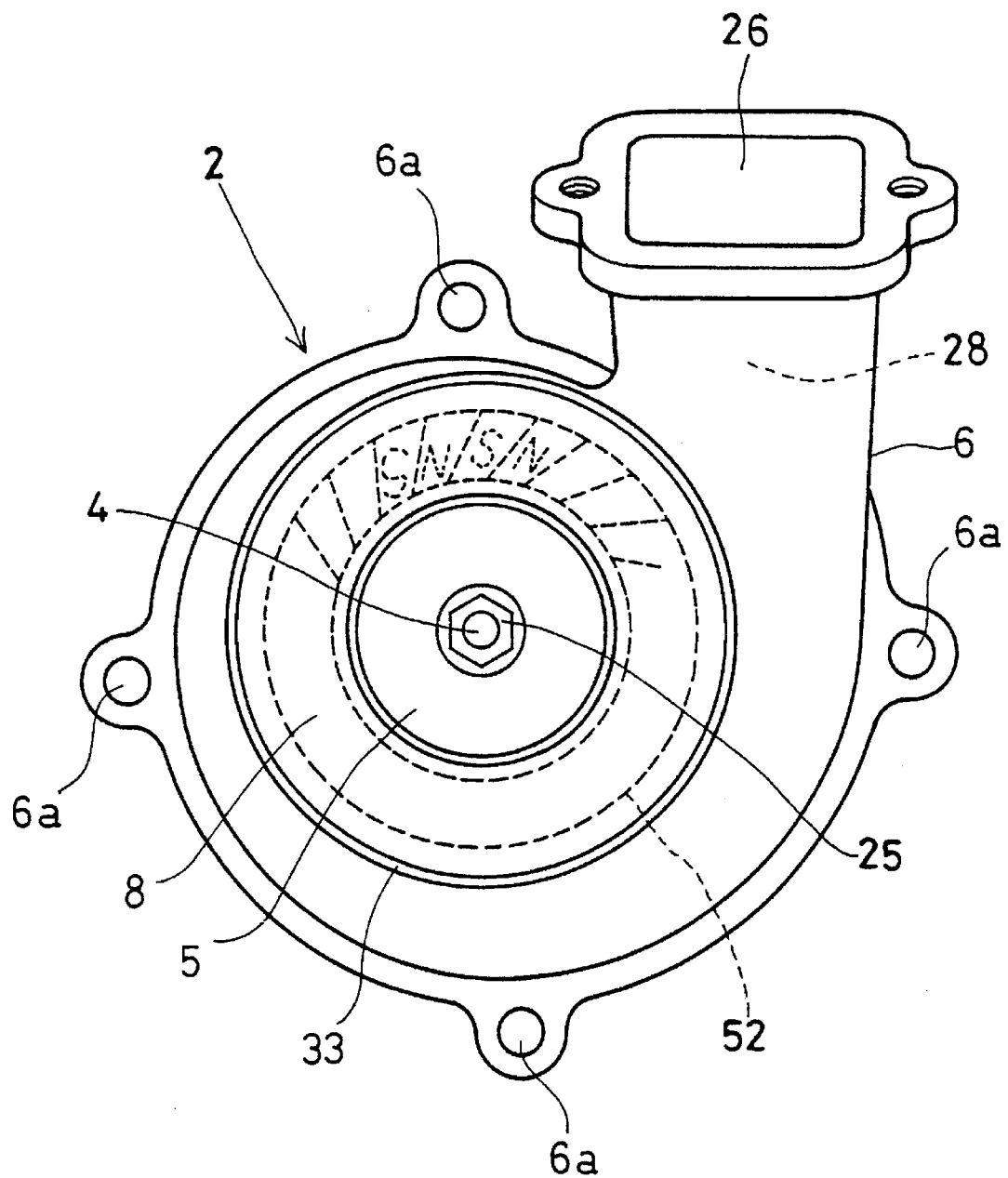
FIG. 3 is a perspective front view illustrating a frame of the water pump of the alternator according to the first embodiment.

The water pump unit 2 has a shaft 4, the poly-V-pulley 5 carried by the shaft 4, a pump frame 6 which supports the shaft 4 rotatably and an impeller 7 as shown in FIG. 1 and FIG. 3.

The shaft 4 is supported rotatably by the pump frame 6 via bearings 21 and a seal member 22. The seal member 22 seals the water pump unit 2 and prevent cooling water from leaking to the inside of the alternator unit 3. The bearing 21 is a sealed ball bearing having an inner race, an outer race and a plurality of balls.

The bowl-shaped poly-V-pulley 5 is press-formed from an aluminum plate and has an annular portion 23 and a pulley base portion 24 which is disposed to cover a front portion of the pump frame 6 around the bearings 21 to receive the poly-V-belt 14. Accordingly, the loading center of the pulley 5 is located near the axial center of the bearing 21, and the distance between the pump unit 2 and the pulley is made as short as possible.

The pump frame 6 is an aluminum die-cast frame which has a plurality of through holes 6a as shown in FIG. 3 and secured to the engine housing 11 by bolts (not shown). The pump frame 6 has an opening 26 at the top thereof and water passage 28 to take cooling water from the opening 26 into a pump chamber 27 shown in FIG. 1. Two water passages 29 are formed between the pump frame 6 and the front surface of the engine housing 11, as shown in FIG. 1 and FIG. 2, to send the cooling water to the water jacket (not shown) of the engine E. The pump frame 6 has a partition 30 formed between the water passage 28 and the water passages 29 and a pump cover 31.

The pump cover 31 is about 10 mm thick on average and has a bearing holder portion 32 which extends axially forward and support the bearings 21, a cylindrical outer members 33 to accommodate the alternator unit 3 and a cylindrical inner member 34 to hold the stator 9 which is disposed in an annular groove 35 formed between the outer cylindrical member 33 and inner cylindrical member 34. The cylindrical outer member 33 shelters the alternator unit and the bearings from water, dust and other foreign particles. The base portion 24 of the poly-V-pulley 5 is disposed at a suitable air gap around the bearing holder portion 32.

The impeller 7 has a body member 42 made of a glass-fiber-reinforced resinous material such as nylon 66 and a metal collar 41 whose outer surface is serrated and press-fitted into the body member 42. The impeller 7 is disposed between the passage 28 and the passages 29 and has a plurality of blades 44 forming water inlets 45 and water outlets 46 on the front surface of the body member 42. Since the impeller rotates at a high speed of the alternator rotor described later, the axial size of the blades according to the preferred embodiment is smaller than that of the conventional blade.

The alternator unit 3 is a permanent-magnet-type brushless-generator which has the shaft 4, the poly-V-pulley 5, a permanent magnet rotor 8, the stator 9 and a three-phase full-wave rectifier 61.

The rotor 8 rotates together with the shaft 4 and the poly-V-pulley 5. The rotor 8 is composed of annular magnetic plate 51 secured to the poly-V-pulley 5 and a permanent magnet 52 fixed to the rear surface of the magnetic plate 51 so that the magnetic flux extends in the axial direction. The magnetic plate 51 is welded to the rear surface of the poly-V-pulley 5 and has a cylindrical wall 53 holding the permanent magnet 52 and an annular flange 54 which extends in the outer cylindrical member 33 to cover the alternator unit 3 from foreign particles.

The permanent magnet 52 is made of rare earth metal magnet such as neodymium (Nd) magnet, alnico magnet, ferrite magnet or resinous magnet such as a mold of nylon with powder mixture of Nd, Fe and B. The permanent magnet 52 is bonded by an adhesive to the annular portion of the rotor 8 to face the stator 9. The permanent magnet 52 is formed into a doughnut which has a plurality (e.g. 16) of skew magnetic poles as shown in FIG. 3 and FIG. 4.

Figure 5:
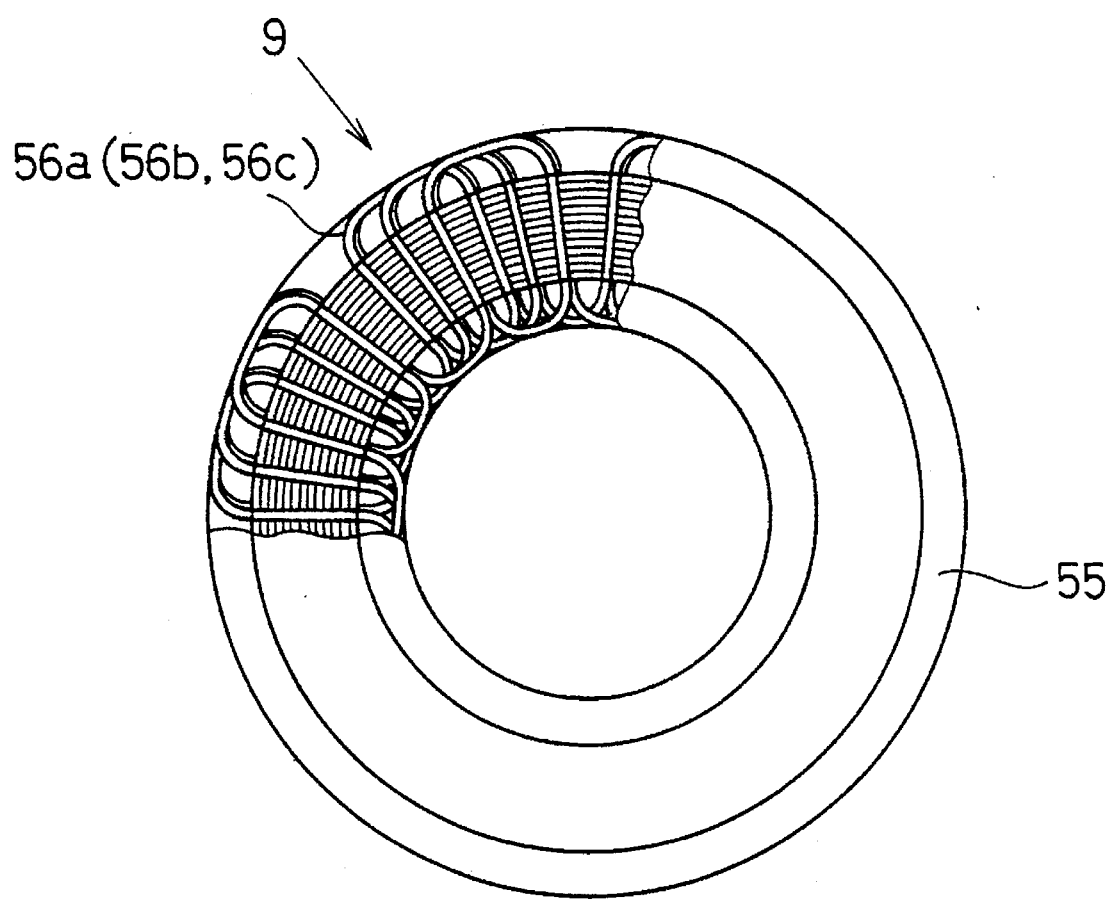
FIG. 5 is a front view illustrating a stator according to the first embodiment.

The stator 9 has a flat-disk-type stator core with a plurality of slots facing the permanent magnet 52 and three-phase armature windings 56a, 56b and 56c disposed in the slots as shown in FIGS. 1, 5 and 6. The stator core 55 is a coiled ribbon of an iron plate as shown in FIG. 5 and fitted in the groove 35 of the pump cover 31 at an outer periphery 36 thereof to have thermal contact with the cooling water.

The stator core 55 is formed so that the magnetic flux can interlink the armature windings effectively. The armature windings 56a–56c are connected in the Y-connection (or in the Δ-connection), and each end thereof is connected to the voltage regulating unit 62 as shown in FIG. 6. The armature windings are molded with a heat conductive resinous material 57 such as epoxy resin including aluminum filler and bonded to the front surface of the pump cover 31. The rectifying unit 61 is composed of three positive-side diodes 64a, 64b and 64c and three negative-side diodes 65a, 65b and 65c.

The voltage regulating unit 62 is a DC—DC converter which provides 12 volt-DC-current and composed of MOSFET 66, a capacitor 67, a diode 68 and a coil 69 having a magnetic core. The MOSFET 66 is controlled (e.g. PWM control) by a computer (not shown) to lower the DC output voltage (e.g. 48 V) of the rectifying unit 61 and smoothed to provide a stable battery voltage (13 V–14 V).

When the engine is started, the driving power is transmitted from the crank shaft to the poly-V-pulley 5 through the poly-V-belt 14, which rotates the shaft 4 and the rotor 8. As a result, the stator 9 generates AC voltage and the rectifying unit 61 and the voltage regulating unit 62 provide the battery charging voltage in the manner as described before. The impeller 7 of the water pump unit 2 is also rotated at the same speed and drives water which is cooled by the radiator (not shown) into pump chamber 27 through the water passage 28 of the pump frame 6 from the opening 26. Since the water passage 28 is thermally connected to the stator 9 of alternator unit 3 via the pump cover 31, the stator 9 is cooled effectively.

The cooling water is thereafter taken into the impeller 7 through the inlets 45 and sent to the water jacket of the engine E from the outlet 46 through the water passage 29.

Since the poly-V-pulley 5 is common to both the alternator unit 3 and the pump unit 2, the number of pulleys installed to the engine can be reduced.

Second Embodiment

Figure 7:
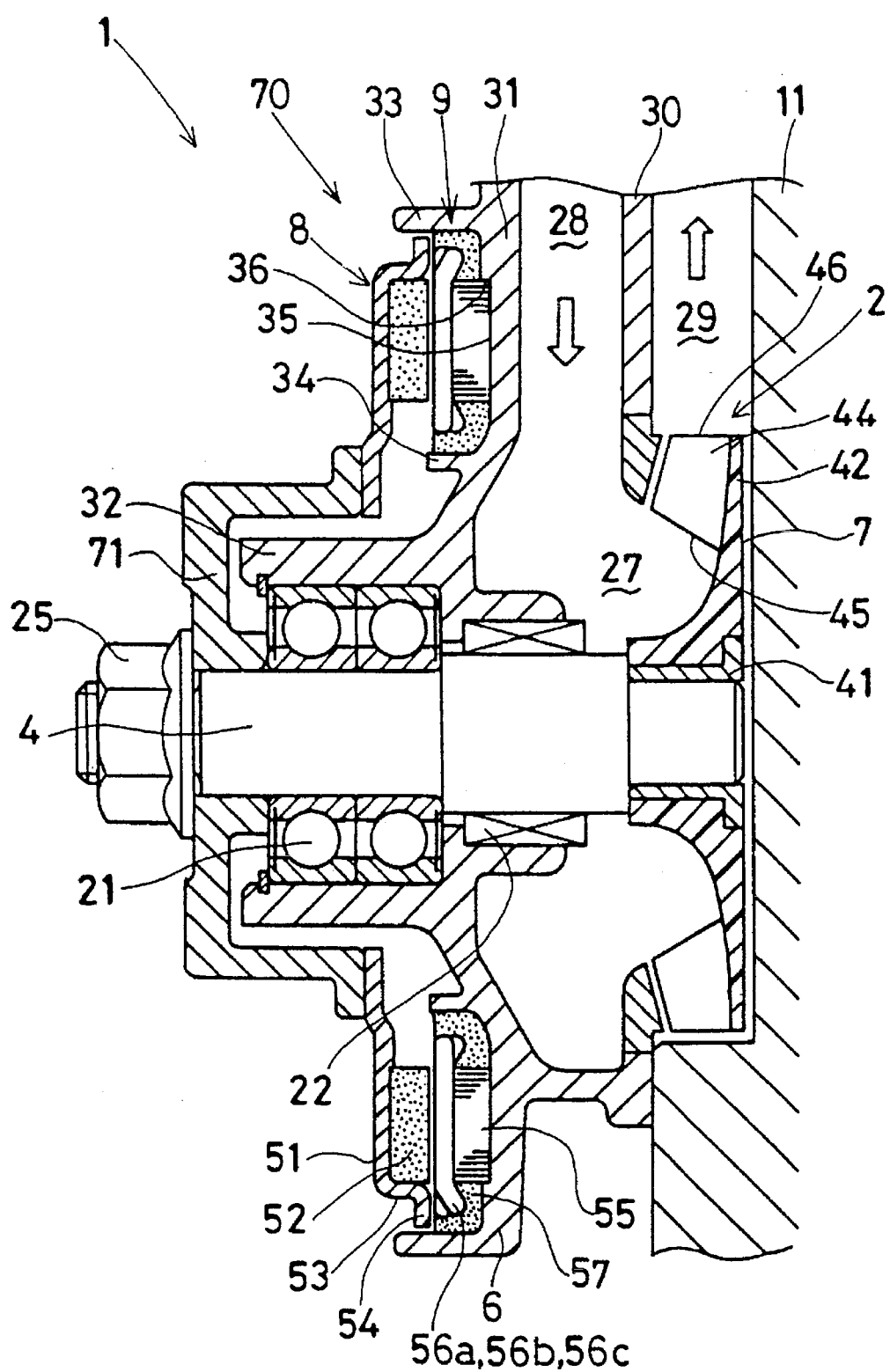
FIG. 7 is a cross-sectional side view illustrating a main portion of an alternator having an integrally combined water pump according to a second embodiment of the present invention.

A rotary electric machine according to a second embodiment of the present invention is described with reference to FIG. 7. The alternator unit 3 of the first embodiment is replaced with an electric motor 70 of the second embodiment. Accordingly, the poly-V-pulley 5 is not necessary. The electric motor unit 70 is a permanent magnet type brushless motor which has three-phase armature windings 56a, 56b and 56c and a rotor 8 with a permanent magnet 52. The impeller 7 is driven by the motor 70 directly. Other reference numerals are substantially the same as those of the first embodiment. The permanent magnet can be replaced with a field coil cooled by the air.

The alternator unit 3 or the motor unit 70 can be connected to the water pump unit 7 by a gear coupling.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rotary electric machine having an integrally combined engine-cooling water-pump of an engine cooling system, said rotary electric machine comprising:

a pump unit fixed to a front surface of an engine and having a pump cover, a water passage formed on an inner surface of said pump cover and connected between said engine cooling system and said engine and an impeller disposed in said water passage, said impeller taking cooling water from said cooling system through said water passage into said engine;

an electric machine unit having a stator disposed in thermal contact with an outer surface of said pump cover for generating power and a rotor for supplying said stator with magnetic flux; and a driving member rotatably secured to said pump cover, said driving member including a shaft for supporting said impeller and said rotor for transmitting driving force from said rotor to said impeller.

2. A rotary electric machine having an integrally combined engine-cooling water-pump as claimed in claim 1, wherein said stator comprises a flat-disk-type core and an armature winding.

3. A rotary electric machine having an integrally combined engine-cooling water-pump as claimed in claim 2, wherein said pump cover comprises an outer cylindrical member for covering said electric machine unit from foreign particles.

4. A rotary electric machine having an integrally combined engine-cooling water-pump as claimed in claim 3, wherein said rotor comprises an annular member for covering said electric machine unit from foreign particles.

5. A rotary electric machine having an integrally combined engine-cooling water-pump as claimed in claim 4, wherein said rotor comprises an annular portion facing said stator core and a permanent magnet fixed to said annular portion.

6. A rotary electric machine having an integrally combined engine-cooling water-pump as claimed in claim 4 wherein said stator and said armature winding are molded with heat conductive insulating material.

7. A rotary electric machine having an integrally combined engine-cooling water-pump of a engine cooling system, said rotary electric machine comprising:

a frame secured to a front surface of an engine and having a wall portion and first water passage formed on a rear surface of said wall portion and connected to said engine cooling system and second water passages connected to said engine;

a driving member including a shaft supported by said wall portion through a bearing;

an electric machine unit having a stator disposed in thermal contact with a front surface of said wall portion and a rotor fixed to said shaft for supplying said stator with magnetic flux; and a pump unit fixed to said frame and having a pump impeller disposed between said first and second water passages, a partition formed between said first and second water passage, said impeller introducing cooling water from said cooling system through said first water passage and send said cooling water to said engine through said second cooling water passage.

8. A rotary electric machine as calmed in claim 7, wherein said wall portion comprises a seal member for preventing cooling water from leaking into said electric machine unit.

9. A rotary electric machine as claimed in claim 7, wherein said second water passage is formed between said partition and said front surface of said engine.

10. A rotary electric machine claimed in claim 9, wherein said driving member comprises a pulley.

11. A rotary electric machine as claimed in claim 10, wherein said pulley comprises a bowl-shaped base member on which a plurality of grooves for receiving a poly-V-belt are formed and said bearing is disposed inside said base member.

12. A rotary electric machine as claimed in claim 7, wherein said stator comprises a flat-disk-type magnetic core and an armature core, and said rotor comprises an annular portion facing said stator core and a permanent magnet fixed to said annular portion.

13. A rotary electric machine as claimed in claim 12 wherein said rotor comprises an annular flange for covering said electric machine unit from foreign particles.

14. A rotary electric machine as claimed in claim 12, wherein said armature core and said armature winding are molded with heat conductive insulating material.

* * * * *